Oct. 30, 1923. 1,472,638

R. F. DICKMAN

ARTIFICIAL FISH BAIT

Filed Oct. 30, 1922

R. F. Dickman,
Inventor

Attorneys

Patented Oct. 30, 1923.

1,472,638

UNITED STATES PATENT OFFICE.

RICHARD F. DICKMAN, OF BRISTOL, INDIANA.

ARTIFICIAL FISH BAIT.

Application filed October 30, 1922. Serial No. 597,890.

*To all whom it may concern:*

Be it known that I, RICHARD F. DICKMAN, a citizen of the United States, residing at Bristol, in the county of Elkhart and State of Indiana, have invented a new and useful Artificial Fish Bait, of which the following is a specification.

This invention relates to fishing tackle and more particularly to artificial bait.

The object of the invention is to provide a bait of this character which is equipped with a plurality of hooks extending in various directions from different sides, all of which are connected by a single piece of wire, the wire also providing attaching means for the line.

Another object is to so construct such a bait that the hooks are located and the bait so shaped that it will zig-zag from eight to ten feet in the water to imitate a craw fish or crab.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
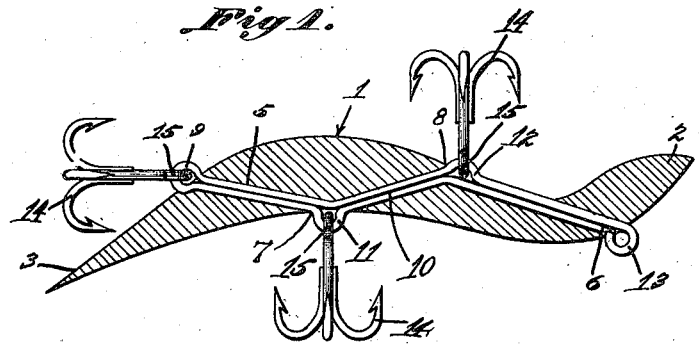
Figure 1 represents a longitudinal section through the bait constituting this invention.
Figure 2:
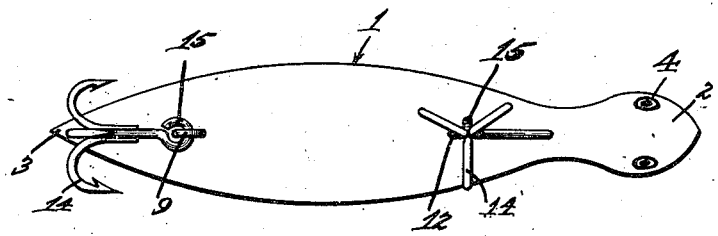
Fig. 2 is a top plan view thereof.
Figure 3:
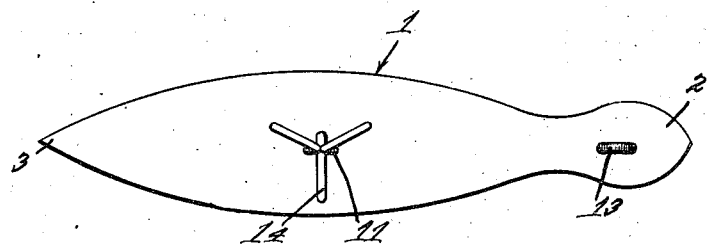
Fig. 3 is a bottom plan view.

In the embodiment illustrated, the bait constituting this invention includes a body 1 composed of wood or any suitable material and shaped as shown clearly in Fig. 1 in the form of a compound curve, the head 2 extending upwardly as shown in Fig. 1, while the tail 3 extends downwardly.

The head 2 is equiped with imitation eyes 4 and a bore 5 is extended longitudinally through the body 1 terminating at its front end at the throat as shown at 6. This bore 5 extends from a point near the tail of the bait downwardly and forwardly through the bottom portion thereof as shown at 7 then upwardly and forwardly through the top as shown at 8 and then again downwardly and forwardly to the point 6.

A hook connector 10 preferably in the form of a folded piece of copper wire is threaded through the bore 5 with an eye 9 extending through the rear end of the bore, another eye 11 through the bottom opening 7, another eye 12 through the opening 8 and terminating at the front where it extends through the bore in an eye 13 to which is designed to be connected the fishing line, not shown.

Hooks 14 of any suitable or desired construction are engaged with the loops or eyes 9, 11 and 12 in any suitable manner, said hooks usually being provided at the ends of their shanks with eyes 15 through which the wire 10 is threaded.

By constructing the bait in the form shown and mounting the hooks in the manner described, when it is drawn through the water it will follow a zig-zag or serpentine course imitating a craw fish or crab in its travel through the water.

This bait may have the body 1 thereof decorated in any suitable or desired manner to attract the fish.

I claim:—

1. A bait of the class described comprising a body member having a bore extending longitudinally in a zig-zag direction therethrough with loops projecting at various points through the surface of the body and fishing hooks connected with said loops.

2. A bait of the class described having a body in the form of a compound curve with a bore extending longitudinally therethrough in a zig-zag direction with one end opening through the upper face of the body near the tail thereof and the other through its lower face near the head, a wire threaded through said bore with loops projecting at various points, and hooks carried by said loops.

In testimony that I claim the foregoing as my own, I have hereto affixed my signature in the presence of two witnesses.

RICHARD F. DICKMAN.

Witnesses:
 M. C. HICVITH,
 LAURA B. KANTZ.